UNITED STATES PATENT OFFICE.

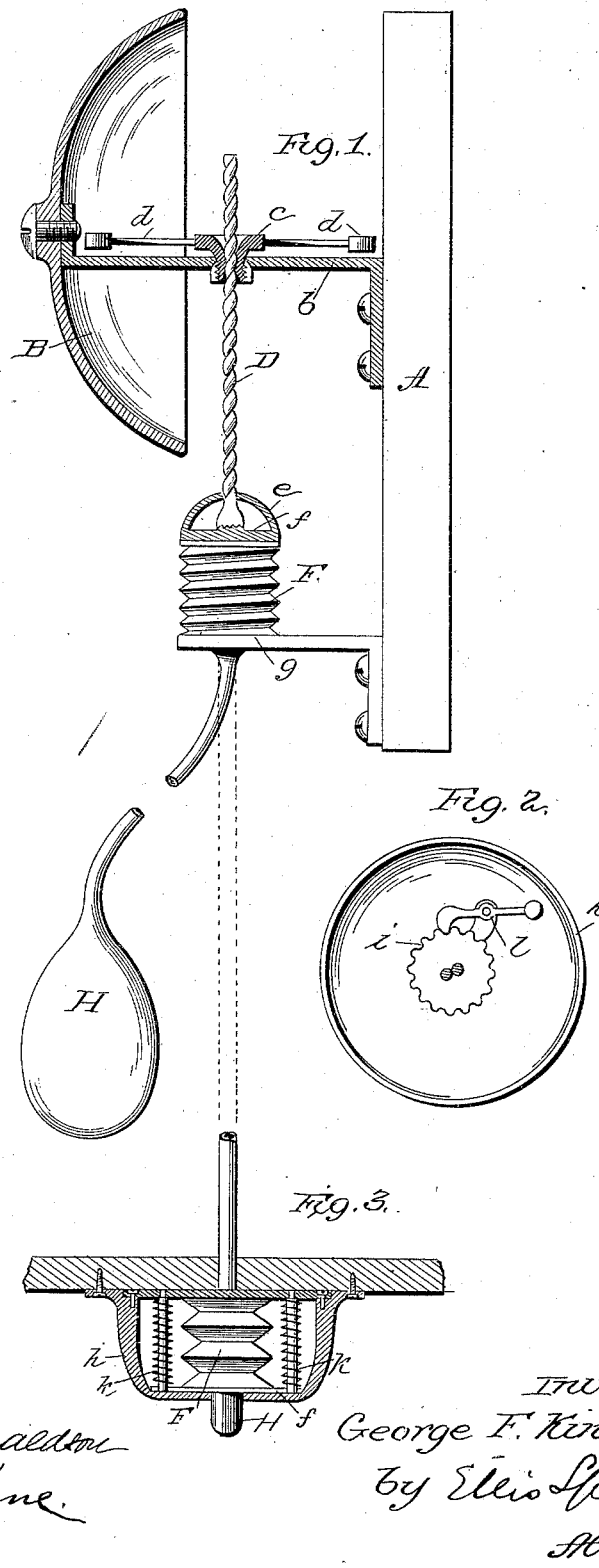

GEORGE F. KINCAID, OF SAN FRANCISCO, CALIFORNIA.

PNEUMATIC BELL.

SPECIFICATION forming part of Letters Patent No. 445,837, dated February 3, 1891.

Application filed October 30, 1889. Renewed October 2, 1890. Serial No. 366,802. (No model.)

*To all whom it may concern:*

Be it known that I, GEORGE F. KINCAID, of the city of San Francisco, in the county of San Francisco and State of California, have invented a new and useful Improvement in Pneumatic Bells; and I do hereby declare that the following is a full, clear, and exact description of the same.

My invention is an improvement in pneumatic bells designed for greater simplicity of construction and certainty of operation.

I have set forth fully hereinafter the details of construction and the essential features of my invention, and illustrated them in the accompanying drawings, in which—

Figure 1 shows the invention in one form of embodiment, partly in side elevation and partly in cross-section. Fig. 2 is a detail of a modification hereinafter explained. Fig. 3 shows the spring-frame and push-button in side elevation.

In the drawings, A represents a post or some suitable support to which the bell and the working parts by which it is operated are attached. I have shown, for example, a common form of bell B. It is supported upon a bracket $b$, and this bracket supports a nut $c$, which is formed to turn freely therein, it being placed in suitable relation to the bell for the operation of the hammer or hammers. The upper part of the nut carries the hammer or hammers $d$. These consist of suitable metal balls or disks supported on light spring-arms, as shown, or they may be of any ordinary construction, and when the nut is turned the hammers are successively carried into contact with the bell, giving the required strokes. The nut is threaded with a very steep pitch and through it works freely a stem D, having corresponding pitch. The stem is held in place by a bail $e$ of the bellows F, the stem passing through this bail loosely, but being held therein from turning by means hereinafter explained. The lower end of the stem is enlarged and serrated and when down bears centrally upon the upper face of the disk $f$, which forms the upper part of the bellows. The disk is serrated to correspond to the serrations in the lower end of the stem, and when the stem bears upon these serrations it is held from turning.

The bellows F consists of the upper disk $f$ and the lower disk $g$ (which is a part of the supporting-bracket) and an intermediate flexible covering which connects the two disks and forms an air-chamber. The air-chamber is connected by means of a tube to an ordinary pressure-bulb H, and when the air is forced up by the pressure-bulb into the air-chamber of the bellows the disk $f$ is raised, carrying with it the stem, which, being prevented from turning by the serrations, turns in its upward movement the nut $c$, and thus operates the arms and causes them to strike the bell. When the pressure on the bulb is removed, the disk $f$ descends, the air being drawn back into the bulb, and as the disk $f$ descends it releases its hold upon the stem through the serrations and allows the stem to turn freely as it descends without turning the nut $c$ or striking the bell again. It will be apparent also that for the serrations I may substitute many known equivalents for holding the stem from turning when it is down and releasing it when it is up.

Any other form of bellows may be used, as a cylinder and piston, and instead of the pressure-bulb I may use a push-button and piston to force the air into the air-chamber. I use the term "bellows" in a generic sense as for any air-forcing apparatus.

The stem may be conveniently made out of strands of wire twisted together, the thread in the nut being fashioned to correspond thereto. The threaded stem may be arranged horizontally, as shown in Fig. 2, and in this case the nut is provided with teeth $i$, which act upon the bell $k$ of a hammer pivoted at $l$, the hammer striking the bell when the tail of the hammer rides over the teeth. Instead of the bulb, I may use a push-button H, Fig. 3, combined with a bellows F within a casing $k$. In this arrangement I use springs to draw back the disk $f$, as shown at K in Fig. 3.

I claim as my invention—

1. In combination with a bellows, a nut carrying a hammer or hammers, a bell, and means for supporting the bellows, nut, and bell, a stem threaded in the nut and held upon the bellows, and a connection between the stem and the bellows, all substantially as described.

2. In combination, the bell, the nut carrying a hammer, the bellows, all supported in suitable relation to each other, and a stem threaded to the nut and sustained in operative relation to the bell, said stem being serrated at its lower end and arranged to engage with the bellows, all substantially as described.

3. In combination, the bell, the nut arranged to revolve continuously in one direction, a hammer on the nut, the threaded stem passing through the nut, means for operating the stem longitudinally, and a clutch connection between said stem and operating means, whereby the stem may revolve in returning to normal position, substentially as described.

In testimony whereof I have signed my name to this specification in the presence of two subscribing witnesses.

GEORGE F. KINCAID.

Witnesses:
    LEWIS B. HARRIS,
    W. H. BARTON.